Dec. 18, 1934.     G. F. ALLEN     1,985,135
VARIABLE SPEED DRIVE
Filed Feb. 14, 1933     2 Sheets-Sheet 1

Dec. 18, 1934.   G. F. ALLEN   1,985,135
VARIABLE SPEED DRIVE
Filed Feb. 14, 1933   2 Sheets-Sheet 2

Inventor
George F. Allen
By Shreve, Crowe & Gordon
Attorneys

Patented Dec. 18, 1934

1,985,135

UNITED STATES PATENT OFFICE 1,985,135

VARIABLE SPEED DRIVE

George F. Allen, Atlanta, Ga.

Application February 14, 1933, Serial No. 656,740

10 Claims. (Cl. 64—8)

Generically this invention relates to variable speed devices, but it is more especially directed to variable speed drives wherein the pitch diameter of the pulley is varied according to operating requirements and to a novel method of actuating the adjustable sheave pulley discs, whereby the desired variation in speed is obtained.

One of the outstanding defects of the devices of this character now in use is that a great amount of power loss is involved in their operation, therefore one of the principal objects of this invention is the production of novel means of operating the device with no appreciable absorption of power in the device itself to obtain the requisite variation in speed, and wherein the power required for effecting such change in speed is negligible.

A further important object of this invention is the provision of a variable speed drive device adapted to be readily mounted in place of the ordinary pulley on individual motors, especially adaptable to driving spinning frames and twisters but equally applicable to other types of machinery where a variable speed drive is desirable.

A further important object of this invention is the provision of a variable speed drive employing one or more narrow V-belts and corresponding sheave pulleys rather than one large belt which has considerably more resistance to compression, and novel means for adjusting with a minimum of power loss, the pulleys for varying the driving speed of said belts by means of which the desired variation of speed is attained.

Another object of this invention is the provision of a variable speed device embodying adjustable pulleys, said device being readily mountable on the motor shaft for an individual drive and means in connection with said device for simultaneously varying the pitch diameter of the pulleys with a minimum of power consumption, since all operating parts of said means have positive connections and wherein power absorbing mechanisms, such as springs and the like are eliminated, said device being readily applicable to frames and motors already installed.

With these and other objects in view which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Figure 4 is an elevational view of the handle and yoke.

Figure 1:
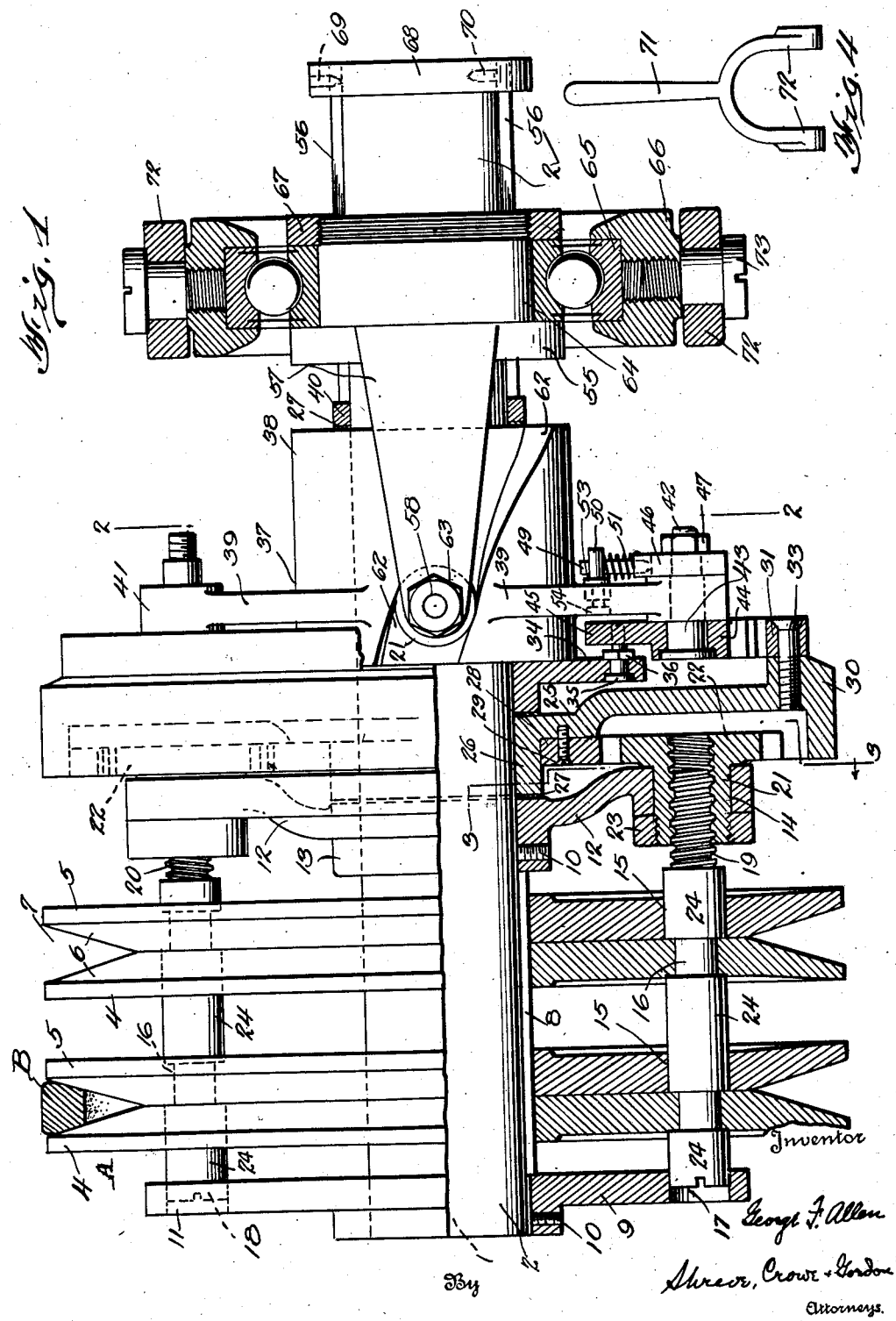
Figure 1 is a longitudinal sectional view of my improved variable speed device with the driving shaft in elevation.
Figure 2:
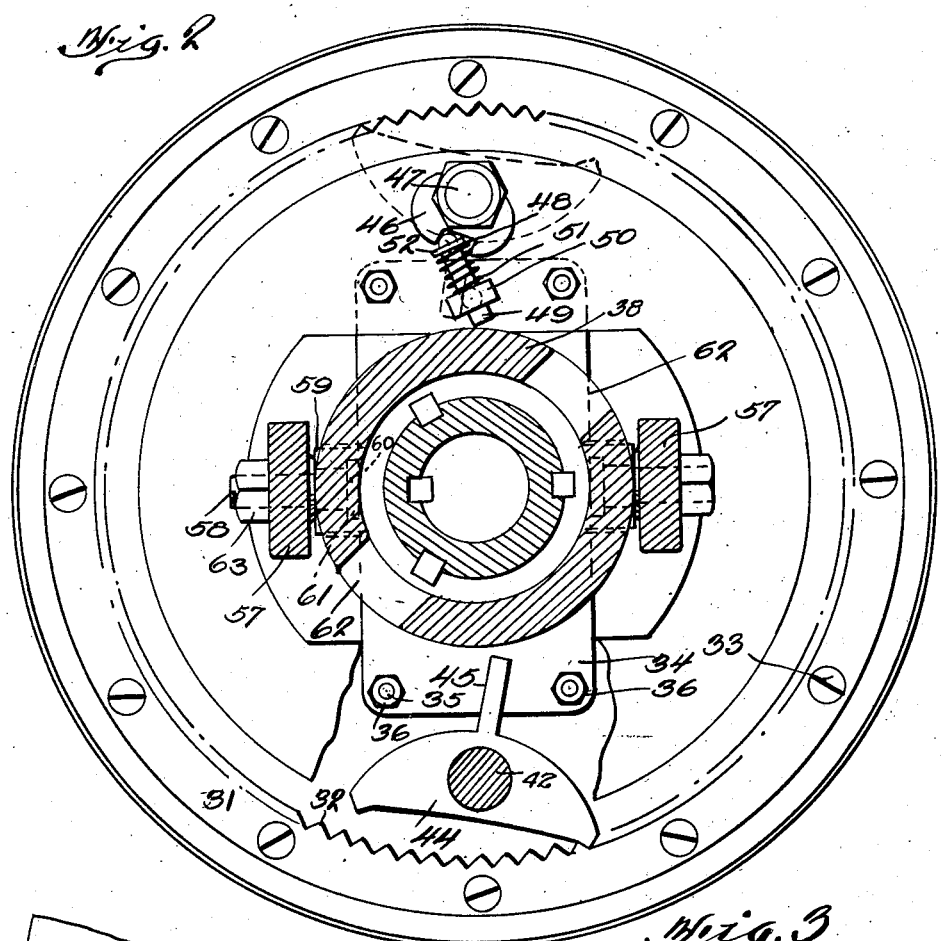
Figure 2 is a cross section taken on the line 2—2 of Figure 1.
Figure 3:
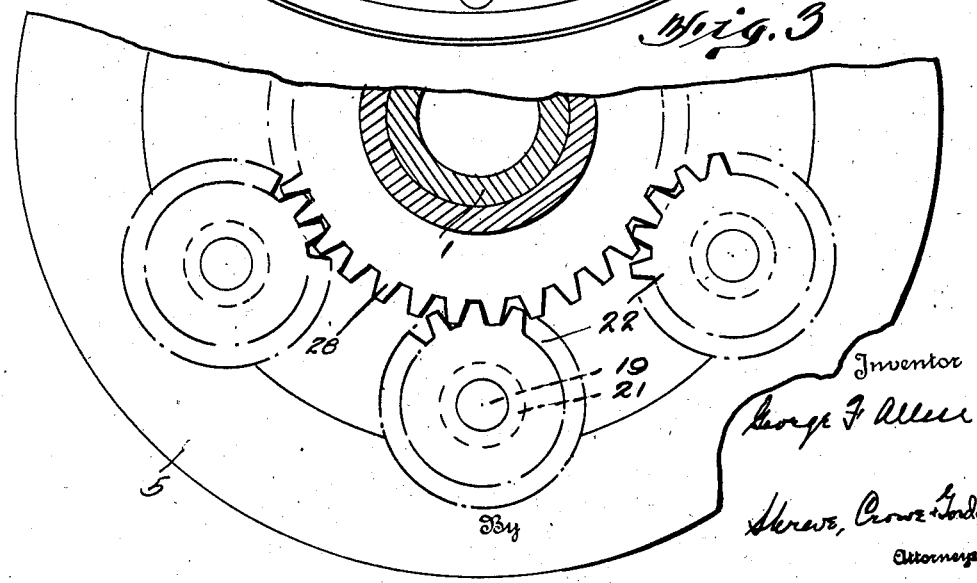
Figure 3 is a fragmentary cross section taken on the line 3—3 of Figure 1.

The variable speed drives with which I am familiar have proven deficient in many particulars, such as being cumbersome and difficult to install, comprising complex mechanisms for actuating the adjustable pulley sheaves, and by reason of the number and coacting parts adapted to absorb power, requiring excessive power to operate, necessitating extra floor space, and being expensive in operation and upkeep, thereby increasing the idle time of spinning frames when employed in connection with such frames and twisters; and it was to overcome such deficiencies and to provide a variable speed drive device requiring little space, readily applicable to frames and motors already installed, adapted to be mounted with equal facility on the motor shaft or driven shaft, embodying novel means for actuating the pulley sheaves to effect speed variation expeditiously with no absorption of power, and with a minimum of power requirements, and adapted to be either manually or automatically controlled as desired, that I designed the device forming the subject matter of this invention.

In the illustrated embodiment characterizing this invention there is shown a shaft 1 adapted to be driven by any suitable means not shown on which is mounted a sleeve 2 which is suitably keyed thereto as at 3 or in any suitable manner. Mounted on said sleeve adjacent one end are a pair of sheaves or pulleys A comprising complemental sections or discs 4 and 5, respectively, each of said sections being formed with an oppositely inclined face 6 forming a peripheral V-shaped groove 7 in which is adapted to travel a correspondingly shaped belt B for transmitting power from the sheave to its ultimate load or mechanism to be driven as will hereinafter more fully appear.

Discs 4 and 5 of the respective sheaves A are keyed to sleeve 2 by splined keys 8 preventing their rotation with respect to said sleeve but permitting their movement in a lateral direction with respect to the sleeve and each other, as for a purpose directly more fully appearing.

Mounted on sleeve 2 adjacent the outer section or disc 4 is an annular flange member 9 suitably secured by stud-bolt 10 and formed with a circumferential series of openings 11. Mounted on said sleeve 2 adjacent the outer section 5 is flange section 12 formed with hub portion 13 secured to said sleeve by stud-bolt 10 and is formed with a series of openings 14 adapted to align with openings 11 of flange section 9. The disc sections 4 and 5 of the sheaves A are each formed with an annular series of openings adapted to align with the openings 11 and 14 of the respective flanges 9 and 12. Each alternate opening 15 being larger than the remaining openings 16. The large openings 15 of each disc 5 are adapted to register with the small openings 16 of its complemental disc 4, and similarly the large openings of discs 4 with the small openings of discs 5. In order to effect the relative adjustment of discs 4 and 5 with respect to said sleeve and each other, two sets of tie-bolts 17 and 18, respectively, are adapted to extend through the aligned openings in sheaves A, and interconnect the flanges 9 and 12. The inner ends of bolts 17 are formed with right hand threads 19 and bolts 18 with left hand threads 20. The threaded portions of the respective bolts are adapted to threadedly engage hub portions 21 of pinions 22, said hub portions being journaled in openings 14 and secured therein by threaded nuts 23. Suitably mounted or fitted on the unthreaded portions of said bolts 17 and adapted to contact the opposing surfaces of disc 4 are spacer sleeves 24, the outermost sleeve 24 is threadedly adjustable on the end of said bolts and adapted for slidable engagement or reciprocating movement in openings 11, whereby unitary lateral movement of the discs 4 is effected. A similar set of sleeves 24 are suitably fitted on bolts 18 adapted to contact opposite sides of discs 5. It will thus be seen that by virtue of the oppositely threaded bolts, when the pinions 22 are rotated, bolts 17 will effect lateral adjustment of discs 4 in one direction and bolts 18 will simultaneously effect similar movement of discs 5 in the opposite direction, thereby increasing or decreasing the pitch diameter of the grooves 7 or sheaves A and as desired, for a purpose hereinafter more fully appearing.

A wheel-like support member 25 substantially corresponding in diameter to pulleys A and formed with hub portion 26 is rotatably mounted on sleeve 2 spaced from flange 12 by washer 27. Mounted on wheel 25 and adapted to seat on hub 26 is ring gear 28 secured by threaded screws 29 and adapted to mesh with pinions 22 to actuate said pinions, and operate bolts 17 and 18 and effect adjustment of pulleys A, as hereinbefore described.

Said support member 25 is formed with a circumferential lateral flange 30 adapted to overlie pinions 22 and mounted on the opposite face of said support 25 preferably offset, but if desired, flush with its circumferential surface is ratchet member 31 formed with ratchet teeth 32 and secured by threaded bolts 33 extending through support 25 as will be clear without further description.

Mounted on sleeve 2 keyed or otherwise rigidly secured thereto and spaced from support 25 by washer 27 is a rectangular bracket plate 34. Mounted in each corner of said plate is a projecting pin 35 secured by nut 36, the free ends of said pins projecting beyond the respective nuts for a purpose hereinafter more fully appearing.

A spider member 37 having an enlarged hub section 38 formed with spider arms 39 is rotatably mounted on sleeve 2 adjacent bracket plate 34 and is secured on said sleeve by a suitably secured retaining ring 40 spaced from said hub by washer 27. The free ends of the oppositely extending spider arms 39 terminate in enlarged portions 41, each of which is apertured to receive a bolt 42 forming adjacent its head with an enlarged portion 43 on which is keyed or otherwise suitably secured a double or reversible pawl 44 formed substantially central of its length with a rearwardly extending lug 45 adapted to engage one of the pins 35 to disengage one end of the pawl with ratchet teeth 32 and cause engagement of the opposite end of the pawl therewith to reverse the direction of travel of support 25, as and for a purpose hereinafter more fully appearing.

Mounted on the free end of bolt 42 on the opposite side of portion 41 is a substantially heart-shaped trip or retaining plate 46 secured by nut 47 and formed with a cut-out portion 48 adapted to receive the rounded end of plunger pin 49, the opposite end of said pin being slidably mounted in lug 50. A spring 51 is mounted on said pin adapted to seat against lug 50 and washer 52 suitably secured on said pin, said spring adapted to maintain plunger 49 in engagement with cut-out portion 47 as will be clear without further description. The lug 50 is rotatably mounted in block 53 suitably embedded in arm 39 and secured by threaded pin 54.

It will thus be seen that movement of lug 45 into engagement with a respective pin 35 reverses the action of pawl 44 and simultaneously effects movement of retaining plate 46 causing the rounded end of plunger 49 to engage the opposite edge of cut-out portion 48, and by means of spring 51 said retaining plate is held in such position maintaining the pawl 44 in engagement with ratchet teeth 32 until the lug 45 is again tripped, causing reverse engagement of said pawl with member 31.

Mounted on the end of sleeve 2 adjacent spider 37 is adjusting collar 55, the hub portion of which is recessed to receive splined keys 56 similar to keys 8 to prevent rotation of the collar about said sleeve but permitting its longitudinal movement with respect thereto for a purpose directly more fully appearing.

Said collar 55 is formed on the opposite sides of sleeve 2 with a pair of parallel rearwardly projecting extensions 57 apertured at their free ends to receive stud-bolts 58 in the inner ends of which are mounted rollers 59 retained by bolt-heads 60, seating, in the present instance, in countersunk portions 61 in said rollers. Said rollers are adapted to engage and travel in the complemental and similarly shaped helical grooves 62 formed in the exterior surface of spider hub 38. The stud-bolts 58 are secured by nuts 63. It is to be understood that any suitable ballbearing type of roller mounting may be employed in lieu of rollers 59 if desired. The adjusting collar 55 is formed with a reduced portion 64 on which is adapted to seat ballbearing assembly 65 suitably embedded and secured in the inner surface of the overlying anchor ring 66, said ball-bearing being secured by threaded ring 67. A retaining ring 68 is mounted on the end of sleeve 2 secured by set screw 69 and serves as a stop to limit the movement of adjusting collar 55 in one direction, and also prevents loosening of the sleeve retaining screw 70, and shifting of said sleeve during operation of the device.

In order to effect longitudinal movement of adjusting collar 55 on sleeve 2, one means of operating said collar is shown as comprising handle 71 terminating in yoke 72, the free ends of which are secured to opposite sides of anchor ring 66 by stud-bolts 73.

While the handle is shown for manually operating the adjusting collar 55, it will be understood that any desired operating means may be employed for either manually or automatically controlling the operation of the device according to the exigencies of the particular requirements as desired.

In order to more clearly define the operation of elements 34, 31 and 39 for causing gear or support 25 and pinions 22 to rotate, it might be well to further state, that the wheel-like support 25 rotatably mounted on sleeve 2, carries a ring gear 28 meshing with pinions 22, and is also formed with circumferential ratchet ring member 31, having an annular series of ratchet teeth 32. The bracket plate 34, carrying at each end a pair of spaced pins 35, is fixedly mounted on sleeve 2 adjacent support 25 and spider 37 having oppositely extending arms 39, is rotatably mounted adjacent plate 34. Rotatably mounted on the free end of each of said arms 39 is a double pawl 44, one end of which is normally held in engagement with ratchet teeth 32 by plate 46, plunger 49 and spring 50. The pawls 44 are each formed with a lug 45 extending between the respective pairs of pins 35. It is obvious that rotation of spider 37 causes pawls 44 which are in engagement with ratchet teeth 32 of ratchet member 31 to rotate wheel 25 and ring gear 28, thereby rotating pinions 22 and bolts 17 and 18. When said spider arms have been rotated sufficiently to cause lugs 45 to engage respective pins 35 said pawls are tripped causing the opposite ends of the pawls to engage teeth 32 of said ratchet member 31, thereby changing the direction of travel of wheel 25 and pinions 22 to vary the pitch diameter of said pulleys, as will hereinafter more fully appear.

While the operation of the device would seem to be clear from the above description, it might be well to further state that movement imparted to adjusting collar 55 by operating handle 71 in a direction parallel to the axis of shaft 1 causes rollers 59 to traverse grooves 62 effecting rotation of spider 37 and a corresponding rotation of ring gear support 25 a predetermined distance, through the instrumentality of the engagement of pawls 44 with ratchet member 31, and causing a corresponding rotation of pinions 22 by ring gear 28, which by virtue of their connection with the right hand threads of bolts 17 axially move discs 4 in one direction and by the left hand threaded connection of bolts 18 simultaneously move discs 5 in the opposite direction, thereby effecting a predetermined variation in the pitch diameters of the pulleys A and radially moving driving means B closer to the axes of said pulleys, or moving said means farther from said axes by the opposite axial movement of said discs in closing direction as desired, and whereby the center lines of the belts or driving means B remain constant in the same plane with respect to the complemental sheaves of the driven machine. Thus it is apparent that by varying the pitch diameters of the pulleys A, the driving speed of said pulleys through the instrumentality of belts B or other driving means is expeditiously effected and with no power absorption and a minimum of power consumption, as above described. Any suitable idler or belt take-up mechanism may be employed to maintain constant the frictional engagement of the belts or driving means B with respect to the sheaves as desired.

It will be observed that the device may be operated in both directions by means of pawls 44 and their controlling mechanisms, the operation of which will now be further described. It is desirable that the device be so designed that it may be operated in both directions, the resetting position from any given completed cycle being performed by simply sliding the adjusting sleeve or collar 55 to whichever of its extreme positions reverses the mechanism from the direction it has been operating. Thus it will be seen that when the spider 37 carrying pawls 44 is operated through a longer stroke than is necessary for the normal function of the mechanism, lugs 45 will come in contact with respective stationary pins 35 on bracket 34 causing disengagement of the pawls from ratchet teeth 32 and effecting engagement of the opposite ends of the pawls therewith, thereby causing movement of ratchet member 31 and support 25 in a reverse direction, said pawls being held in such position by springs 51 and plungers 49 until reversal of the direction of travel of ratchet member 31 is again desired. It is thus apparent that movement of adjusting collar 55 and rollers 59 with respect to grooves 62, rotates spider 37 and effects relative movement of sheaves 4 and 5 in one direction with respect to each other, and further predetermined movement of said collar 55 through the instrumentalities above described effects reversal of the double pawl members 44, thereby effecting a reversal of movement of support 25 causing relative movement of the sheaves 4 and 5 in the opposite direction, as will be clear without further description.

While I have shown the device as manually controlled, it is to be understood that any suitable means may be synchronized with the ultimate driven mechanism to automatically control the variation in driving speed according to the particular load or operating requirements.

It is apparent that I have designed a variable speed drive mechanism having all coacting and interrelated operating parts positively connected, whereby a continuous or intermittent variation in the driving speed of the pulleys may be expeditiously effected with a minimum of power consumption during operation of the device, yet one occupying small space, easily installable, simple in construction, manufacturable at a reasonable cost, and by reason of its lack of power absorption, designed to materially decrease operating cost.

Although in practice I have found that the form of my invention illustrated in the accompanying drawings and referred to in the above description as the preferred embodiment is the most efficient and practical; yet realizing the conditions concurrent with the adoption of my invention will necessarily vary, I desire to emphasize that various minor changes in method, details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A device for varying the driving speed of a pulley comprising driving means for the pulley, and means in connection with the pulley for radially moving the driving means with respect to the axis of rotation of said pulley, said means including a shaft, complemental sheave pulley sections mounted on the shaft, means connecting said sections, ratchet means associated with said connecting means, rotatable pawl means engageable with said ratchet means, and means for rotating said pawl means with respect to said shaft, whereby simultaneous axial movement of the respective sheave sections is effected to vary the pitch diameter of said pulley.

2. A device for varying the driving speed of a pulley comprising driving means for the pulley, and means in connection with the pulley for radially moving the driving means with respect to the axis of rotation of said pulley, said means including a shaft, complemental sheave sections slidably mounted on said shaft, spacer means connecting said sections, ratchet means associated with said spacer means, pawl means engageable with said ratchet, and control means movable parallel with respect to the shaft for moving said pawls in a rotative direction, whereby simultaneous axial movement of the respective sheave sections to vary the pitch diameter of said pulley is effected.

3. A device for varying the driving speed of a pulley comprising driving means for the pulley, and means in connection with the pulley for radially moving the driving means with respect to the axis of rotation of said pulley, said means including a shaft, a rotatable means having a hub extension, sheave pulley sections mounted on the shaft, screw and pinion means connected to said sections including ratchet means, means rotatable with respect to said shaft and engageable with said ratchet means, and control means coacting with said extension movable parallel to said shaft to effect a predetermined rotation of said rotatable means, whereby axial movement of the respective sheave sections is effected to predeterminedly vary the pitch diameter of said pulley.

4. A device for varying the driving speed of a plurality of pulleys operating as a driving unit comprising driving means for the pulleys, and means in connection with the pulleys for radially moving the driving means with respect to the axes of rotation of said pulleys, said means including a shaft, a plurality of pulleys including complemental sheave sections mounted on the shaft, means connecting the similar sections of each pulley, ratchet means associated with said connecting means, rotatable pawl means engageable with said ratchet means, and means for rotating said pawl means with respect to said shaft, whereby simultaneous axial movement of the respective sheave units is effected to vary the pitch diameters of the respective pulleys.

5. A device for varying the driving speed of a plurality of pulleys operating as a driving unit comprising driving means for the pulleys, and means in connection with the pulleys for radially moving the driving means with respect to the axes of rotation of said pulleys, said means including a plurality of pulleys including complemental sheave sections mounted on the shaft, spacer means connecting similar sections of the respective pulleys, ratchet means associated with said spacer means, pawl means engageable with said ratchet means, and control means movable parallel with respect to the shaft for moving said pawls in a rotative direction with respect to said shaft, whereby simultaneous axial movement of the respective connected sheave sections is effected to vary the pitch diameters of said pulleys.

6. A device for varying the driving speed of a plurality of pulleys operating as a driving unit comprising driving means for the pulleys, and means in connection with the pulleys for radially moving the driving means with respect to the axes of rotation of said pulleys, said means including a shaft, a plurality of complemental pulley sections mounted on the shaft, screw and pinion means connected to said sections including ratchet means, means rotatable with respect to said shaft and engageable with said ratchet means, said rotatable means formed with grooves and control means movable parallel to said shaft and formed with means engageable in said grooves to effect a predetermined rotation of said rotatable means, whereby axial movement of the respective connected sheave section units is effected to predeterminedly vary the pitch diameters of said pulleys.

7. A device for varying the driving speed of a pulley comprising driving means for the pulley, and means in connection with the pulley for radially moving the driving means with respect to the axis of rotation of said pulley, said means including a shaft, complemental sheave sections slidably mounted on said shaft, screw and pinion means connecting said sections including ratchet means, pawl means coacting with said ratchet means and including a rotatable means, means normally maintaining said pawl means in engagement with said ratchet means for moving the latter in one direction and operable to effect movement of the same in the opposite direction, and control means movable parallel to the axis of said shaft and coacting with said rotatable means to advance said ratchet means, whereby axial movement of the respective sheave sections is effected to vary the pitch diameter of said pulley.

8. A device for varying the driving speed of a plurality of pulleys operating as a driving unit comprising driving means for the pulleys, and means in connection with the pulleys for radially moving the driving means with respect to the axes of rotation of said pulleys, said means including a shaft, a plurality of complemental pulley sections mounted on the shaft, screw and pinion means connected to said sections including ratchet means, means rotatable with respect to said shaft, pawl means carried by the rotatable means and engageable with said ratchet means, and control means for effecting rotation of said rotatable means, and pawls to drive said ratchet in one direction, said control means being additionally operable to reverse the driving direction of said pawls to operate said ratchet in the opposite direction, whereby axial movement of the respective connected sheave section units is effected to predeterminedly vary the pitch diameters of said pulleys.

9. A device for varying the driving speed of a pulley comprising driving means for the pulley, and means in connection with the pulley for radially moving the driving means with respect to the axis of rotation of said pulley, said means including a shaft, complemental sheave sections slidably mounted on said shaft, a rotatable means mounted on the shaft, screw and pinion means connecting said sections including ratchet means, reversible pawl means carried by said rotatable means coacting with said ratchet means, and control means coacting with said rotatable means to advance said ratchet in one direction and additionally operable to reverse said pawls to advance said ratchet in the opposite direction, whereby axial movement of the respective sheave sections is effected to vary the pitch diameter of said pulley.

10. A device for varying the driving speed of a pulley comprising driving means for the pulley, and means in connection with the pulley for radially moving the driving means with respect to the axis of rotation of said pulley, said means including a shaft, complemental sheave pulley sections mounted on the shaft, means connecting said sections, said means including a ratchet control element coacting with said connecting means, a member fixedly mounted with respect to said shaft, a rotatable spider element mounted on said shaft, reversible pawls carried by said spider and engageable with said ratchet to rotate said control element, control means movable parallel to said shaft and coacting with said spider element to effect rotation thereof, and means carried by said fixed member engageable with said pawls, whereby when said spider has been predeterminedly rotated, the driving engagement of said pawls with respect to said ratchet will be reversed.

G. F. ALLEN.